(12) United States Patent
Martin et al.

(10) Patent No.: US 9,107,269 B2
(45) Date of Patent: Aug. 11, 2015

(54) EMERGENCY LIGHTING DEVICE

(71) Applicant: C-M Glo, LLC, Watertown, WI (US)

(72) Inventors: John Douglas Martin, Watertown, WI (US); Aaron W. Smith, Watertown, WI (US); Chamy Chiachen Lutz, Oconomowoc, WI (US)

(73) Assignee: C-M Glo, LLC, Watertown, WI (US)

( * ) Notice: Subject to any disclaimer, the term of this patent is extended or adjusted under 35 U.S.C. 154(b) by 0 days.

(21) Appl. No.: 13/791,256

(22) Filed: Mar. 8, 2013

(65) Prior Publication Data

US 2013/0234595 A1 Sep. 12, 2013

Related U.S. Application Data

(60) Provisional application No. 61/608,751, filed on Mar. 9, 2012.

(51) Int. Cl.
| | | |
|---|---|---|
| H05B 39/10 | (2006.01) | |
| H05B 33/08 | (2006.01) | |
| H05B 37/02 | (2006.01) | |
| H02J 9/06 | (2006.01) | |

(52) U.S. Cl.
CPC ............ *H05B 33/0884* (2013.01); *H02J 9/065* (2013.01); *H05B 37/0272* (2013.01)

(58) Field of Classification Search
CPC .......... H05B 37/0272; H02J 9/00; H02J 9/04; H02J 2009/068; F21V 19/003; F21V 19/001
USPC ......... 315/32, 34, 51, 86, 178, 88; 340/693.1, 340/693.2; 307/64, 65, 66, 43; 362/20, 362/249.01, 249.02
See application file for complete search history.

(56) References Cited

U.S. PATENT DOCUMENTS

| | | | |
|---|---|---|---|
| 5,303,124 A | 4/1994 | Wrobel | |
| 5,365,145 A | 11/1994 | Fields | |
| 5,412,542 A | 5/1995 | Mandy | |
| 5,416,384 A | 5/1995 | Bavaro | |
| 5,473,517 A | 12/1995 | Blackman | |
| 5,574,423 A | 11/1996 | Vosika et al. | |
| 5,713,655 A | 2/1998 | Blackman | |
| 5,833,350 A | 11/1998 | Moreland | |
| 6,000,807 A | 12/1999 | Moreland | |
| 6,010,228 A | 1/2000 | Blackman et al. | |
| 6,141,234 A | 10/2000 | Knoble et al. | |
| 6,663,248 B2 | 12/2003 | Hsieh | |
| 6,933,678 B2 | 8/2005 | Kuo | |

(Continued)

FOREIGN PATENT DOCUMENTS

| | | |
|---|---|---|
| JP | 2004-185359 | 7/2004 |
| KR | 10-0896529 | 5/2009 |
| KR | 10-2010-0125914 | 12/2010 |

*Primary Examiner* — Thuy Vinh Tran
(74) *Attorney, Agent, or Firm* — Boyle Fredrickson, S.C.

(57) ABSTRACT

An emergency lighting device includes a backup power supply for illuminating a light during a power loss. The lighting device includes a transmitter, which transmits a signal to a receiver during a power outage. When the receiver receives the signal, the source of power switches from the primary power source, e.g., AC utility power, to a backup power source, e.g., DC battery power. The lighting device may include an LED lamp in which AC-LEDs are selectively illuminated when primary power source is delivered and DC-LEDs which are selectively illuminated during a power outage.

19 Claims, 11 Drawing Sheets

(56) References Cited

U.S. PATENT DOCUMENTS

| | | |
|---|---|---|
| 6,986,589 B2 | 1/2006 | Evans et al. |
| 7,218,056 B1 | 5/2007 | Harwood |
| 7,321,301 B2 | 1/2008 | Spoltor et al. |
| 7,391,159 B2 * | 6/2008 | Harwood ............... 315/86 |
| 7,520,072 B2 | 4/2009 | Yu |
| 7,645,047 B2 | 1/2010 | Martinez |
| 7,690,802 B2 | 4/2010 | Higley et al. |
| 7,737,640 B2 | 6/2010 | Marques et al. |
| 7,824,046 B2 | 11/2010 | Martinez |
| 7,878,668 B2 | 2/2011 | Martinez |
| 8,002,445 B2 | 8/2011 | Tachino et al. |
| 8,018,161 B2 * | 9/2011 | Smith et al. ............ 315/86 |
| 8,025,418 B2 | 9/2011 | Zick |
| 8,066,391 B2 | 11/2011 | Zhong |
| 8,066,392 B2 | 11/2011 | Wang |
| 8,076,856 B2 | 12/2011 | Tian et al. |
| 8,089,218 B2 | 1/2012 | Yeh et al. |
| 8,100,545 B2 * | 1/2012 | Dupre et al. ............ 362/20 |
| 8,115,397 B2 | 2/2012 | Jonsson |
| 8,120,260 B2 * | 2/2012 | Dupre et al. ............ 315/149 |
| 8,172,436 B2 | 5/2012 | Coleman et al. |
| 8,183,783 B1 | 5/2012 | Jonsson |
| 8,272,757 B1 | 9/2012 | Fan et al. |
| 8,299,712 B2 * | 10/2012 | Smith et al. ............ 315/86 |
| 8,333,481 B2 | 12/2012 | Deng |
| 8,456,090 B2 | 6/2013 | Jonsson |
| 2004/0207534 A1 | 10/2004 | Bolta |
| 2006/0146553 A1 | 7/2006 | Zeng et al. |
| 2007/0008710 A1 | 1/2007 | Nielson et al. |
| 2008/0180935 A1 | 7/2008 | Burdeen et al. |
| 2008/0232081 A1 | 9/2008 | Martinez |
| 2008/0232082 A1 | 9/2008 | Martinez |
| 2009/0180271 A1 | 7/2009 | Jachmann |
| 2009/0185359 A1 | 7/2009 | Martinez |
| 2010/0002411 A1 | 1/2010 | Zhong |
| 2010/0020527 A1 | 1/2010 | Fiermuga |
| 2010/0061076 A1 | 3/2010 | Mandy et al. |
| 2010/0067213 A1 | 3/2010 | Liu |
| 2010/0080367 A1 | 4/2010 | Miskin |
| 2010/0213849 A1 | 8/2010 | Chien |
| 2010/0237781 A1 | 9/2010 | Dupre et al. |
| 2010/0277889 A9 | 11/2010 | Martinez |
| 2010/0290207 A1 | 11/2010 | Chan et al. |
| 2010/0302758 A1 | 12/2010 | Wang |
| 2011/0211330 A1 | 9/2011 | Wang |
| 2012/0112654 A1 * | 5/2012 | Choong et al. ............ 315/291 |
| 2012/0212150 A1 * | 8/2012 | Lakirovich et al. ........... 315/250 |
| 2012/0217799 A1 | 8/2012 | Palmer et al. |
| 2012/0293982 A1 | 11/2012 | Labans |
| 2012/0320572 A1 | 12/2012 | Fischer et al. |
| 2013/0127362 A1 * | 5/2013 | Trainor et al. ............ 315/224 |

* cited by examiner

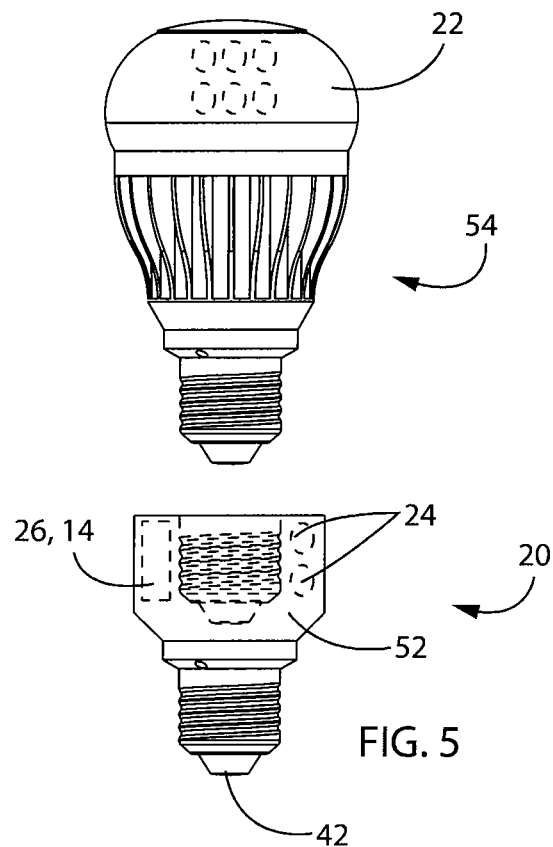
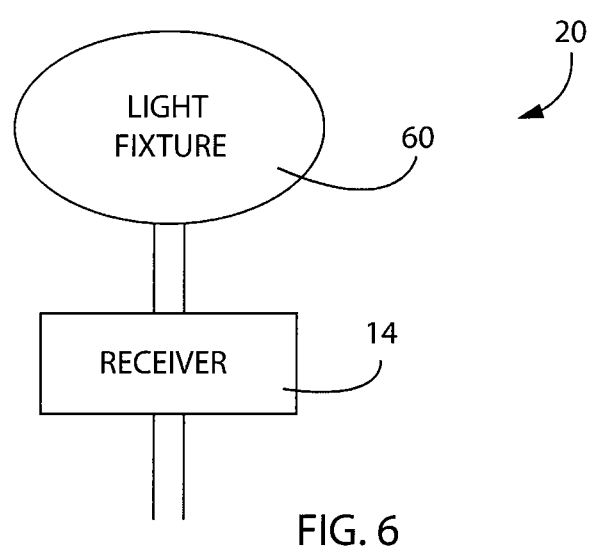

LIGHT ENGINE SCHEMATIC

EMERGENCY LIGHTING DEVICE

CROSS-REFERENCE TO RELATED APPLICATIONS

This application claims priority to U.S. Provisional Patent Application No. 61/608,751 filed on Mar. 9, 2012 and entitled Emergency Lighting Device, the entirety of which is hereby incorporated by explicit reference thereto.

BACKGROUND OF THE INVENTION

The present invention relates to an emergency lighting device and, more particularly, to an emergency lighting device including a backup power supply for illuminating a light during a power loss. Furthermore, the present invention relates to a transmitter which transmits a signal to a receiver for switching the power source from the primary power source to the backup power source during a power outage. The lighting device includes both light emitting elements that receive alternating current (AC) and light emitting elements that receive direct current (DC).

Lighting devices are normally powered by a utility power source which delivers AC power to illuminate the device. This is normally accomplished by using an electrical plug attached to the device and connecting it to an electrical wall outlet or socket. Alternatively, a lighting device may be attached to a ceiling or wall and hard-wired to an electrical connection. The light emitting elements must be compatible with the delivered source current, otherwise an AC-DC converter, adapter, or transformer is necessary to derive the required voltage and power from the source.

In the event of a power outage, power from the utility power source may become unavailable. This will result in the lighting device losing power and a black-out situation. Providing a back-up power source during a power outage is important for many residential and commercial buildings where safety and accessibility during a black-out becomes a major concern. Additionally, there are many state laws and building codes that require public buildings to have back-up lighting, and thus, it has been a goal to create dependable emergency lighting.

Many of the currently existing emergency lighting systems rely upon dual-wiring of a light source with a primary power source (typically AC utility power) and an additional back-up power source (typically DC battery power). This type of arrangement normally requires a relay and switch arrangement from the primary power source to the back-up power source during a power outage. These types of emergency lighting systems must come prewired or be manually rewired to provide this switching feature. Retrofit installation of these features requires labor by electricians and often alteration of walls. This is a significant drawback for users who would like an inexpensive and simple solution for adopting an emergency lighting scheme to preexisting light fixtures.

Additionally, the reliance on both primary AC utility power and backup DC battery power creates an inconsistency between the power source types being delivered to the lighting device. Thus, the need for an AC-DC convertor is naturally required to make at least one of the sources compatible with the lighting device. However, the existence of an AC-DC converter is space consuming, especially within the confines of a light bulb or light fixture lamp, and causes the electrical components to become more unstable due to the heat by-product.

The present invention seeks to improve upon such prior art by providing an emergency lighting device that is adaptable to preexisting lighting systems and includes a backup power source that operates in the event of a power outage without requiring special wiring.

SUMMARY OF THE INVENTION

The present invention is generally directed to an emergency lighting device having a transmitter connected to a power outlet and a lamp assembly to receive a signal from the transmitter. The lamp assembly is generally powered by hard-wiring in an electrical circuit, or by connecting the lamp assembly to a wall outlet, plug, or socket and delivering utility power to the lamp assembly. However, in the case of a power outage when utility power is interrupted, a sensor located at the transmitter detects the loss of power and transmits a signal, e.g., radio frequency (RF) signal or other wireless signal, to a receiver at the lamp assembly for switching the origin of power to a back-up source, e.g., a rechargeable battery in the lamp assembly. Alternatively, the transmitter and receiver may communicate through a wireless network, e.g., ZigBee or WiFi, thus allowing a user to control the lighting device remotely.

In a representative embodiment the light assembly is a preexisting ceiling light fixture or ground lamp connected to a power source and having a light socket for receiving a lamp or bulb. The lamp or bulb may be a light emitting diode (LED) lamp with a built-in battery, allowing the power source to alternate from utility power to battery power easily.

The user may insert the LED lamp into any common light fixture or ground lamp. The LED lamp has a receiver for receiving a signal from a transmitter when power to the transmitter is interrupted. The power to the transmitter may be interrupted during an electrical power failure or by actively switching off the power supply to the outlet. When the signal is received that power has been interrupted, power to the LED lamp is switched from the primary power source to the battery source. The backup battery source allows for temporary illumination of the LED lamp so that those in the building may safely exit the building.

Additionally, during an outage, a controller may control the amount of power output that is delivered to the device, for example, to limit the power output to conserve battery power or to provide a visual signal to the user that the device is now running on the back-up source. A visual or audio signal may also alert the user to a low battery situation and allow the user to replace the battery to prolong illumination.

BRIEF DESCRIPTION OF THE DRAWINGS

The drawings illustrate the best mode presently contemplated for carrying out the invention.

In the drawings:

FIG. 5 is a side elevation view of an alternative embodiment of the present invention in the form of a two-piece LED lamp and receiver combination;

FIG. 6 is a schematic representation of an alternative embodiment of the present invention in the form of a light fixture having a built-in receiver;

DETAILED DESCRIPTION OF THE DRAWINGS

This invention relates to an emergency lighting device including a number of light-emitting elements configured to operate in combination with one another and including a means for detecting a loss of power condition.

Figure 1:
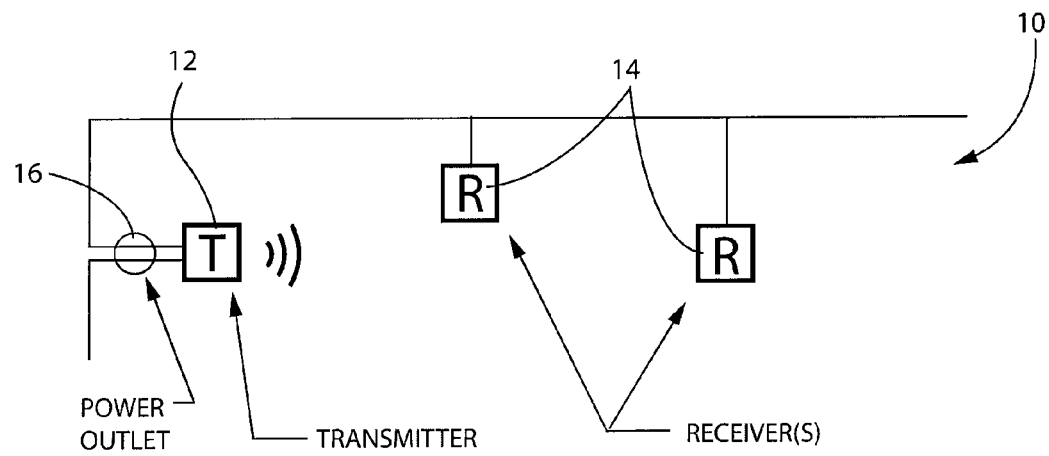
FIG. 1 is a schematic drawing of the emergency lighting system in according with the present invention showing the interconnection between the transmitter, power outlet, and receiver(s)

Referring to FIG. 1, a schematic drawing of an emergency lighting system 10 according to the present invention is shown. In the emergency lighting system 10, a transmitter 12 is provided for detecting the loss of primary power. The transmitter 12 is coupled to a standard power outlet 16 and is able to detect a loss of power condition at the power outlet. It is understood, however, that the transmitter 12 may also be hard-wired into the electrical system of a building. It is contemplated that the detection may be made whether the loss of power is due to a power failure or by manually shutting off power to the outlet, such as by a switch. The transmitter 12 is configured to be in operable communication with a number of receivers 14 disposed about a given location and each in operable communication with a lighting device according to the present invention. In this manner, the transmitter 12 may be configured to send a signal, e.g., a radio frequency (RF) signal, to each of the receivers 14 when primary power is lost such that each of the receivers 14 is then configured to switch to emergency mode whereby light-emitting elements of the lighting device are illuminated and powered by a backup power source. Understandably, the system 10 may be configured so as to incorporate a number of transmitters 12 configured to be in wireless communication with a number of receivers 14 wherein each of the number of transmitters 12 is assigned to a predetermined subset of receivers. In this manner, relatively larger areas may employ the system 10.

It is contemplated that the emergency lighting system 10 may be configured to communicate through a wireless communication network, e.g., a Wi-Fi or ZigBee network. For example, a ZigBee network may be favorable as it provides a network architecture ideal for applications requiring a low data rate, long battery life and secure networking. A ZigBee transceiver may be coupled to transmitter 12 to transmit communication data to receivers 14. A ZigBee chip may be coupled to receivers 14 to accept communication data when there is a loss of power at transmitter 12. Additionally, other devices, such as cell phones and tablets which are connected to the network wirelessly or via a wireless "cloud", may also communicate with the system 10 and control the lighting device. This allows the user to control the lighting device remotely, for example, when the user is away from home or away from the building. It is also contemplated that the user may use a remote control to communicate with the lighting device via RF signal or infrared signal.

Figure 2:
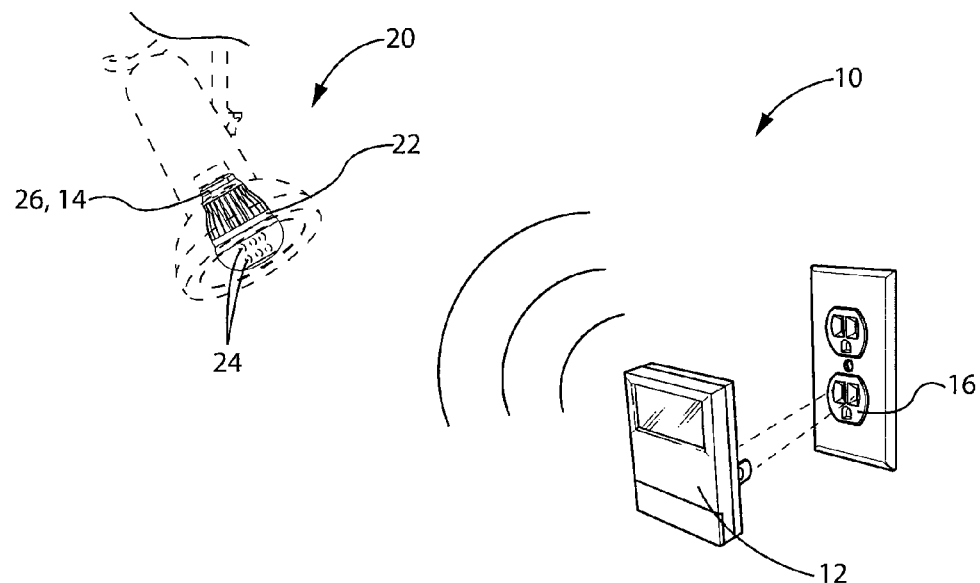
FIG. 2 is an illustration of an embodiment of the present invention showing the wall transmitter interacting wirelessly with a receiver located in a ceiling light fixture.

Referring now to FIG. 2, a representative embodiment of the emergency lighting system 10 according to the present invention is shown. In the illustrated embodiment, the lighting device 20 is a single unit light bulb or lamp that can be employed in any light fixture (as shown), such as a ceiling, wall or floor light fixture, or any household ground lamp. The light bulb or lamp may include a number of light-emitting elements 24 such as, for example, light emitting diodes (LEDs) or other such elements capable of emitting light for providing illumination during a loss of power condition. The lighting device 20 may include a lamp 22 for securely housing the light-emitting elements 24, which may further include a lens or other means for projecting the light emitted by the light-emitting elements 24 in a predetermined manner.

An electronics arrangement 26 may be coupled to the lighting device to provide the necessary circuitry and electronics for operation with a controller, such as a printed circuit board. A housing may be provided to house the electronics arrangement operably coupled with the light-emitting elements 24 to selectively operate the light-emitting elements as will be discussed. Alternatively, the electronics arrangement 26 may be housed entirely within lamp 22.

The receiver 14 of the lighting device 20 is in operative communication with the electronics arrangement 26. The receiver 14 may be a wireless receiver configured to operate via RF, WiFi, ZigBee, or by any other similar such wireless communication standard. The receiver 14 may be in communication with the transmitter 12, which may be in the form of a wireless transmitter configured to transmit signals to the receiver as will be described.

Figure 3:
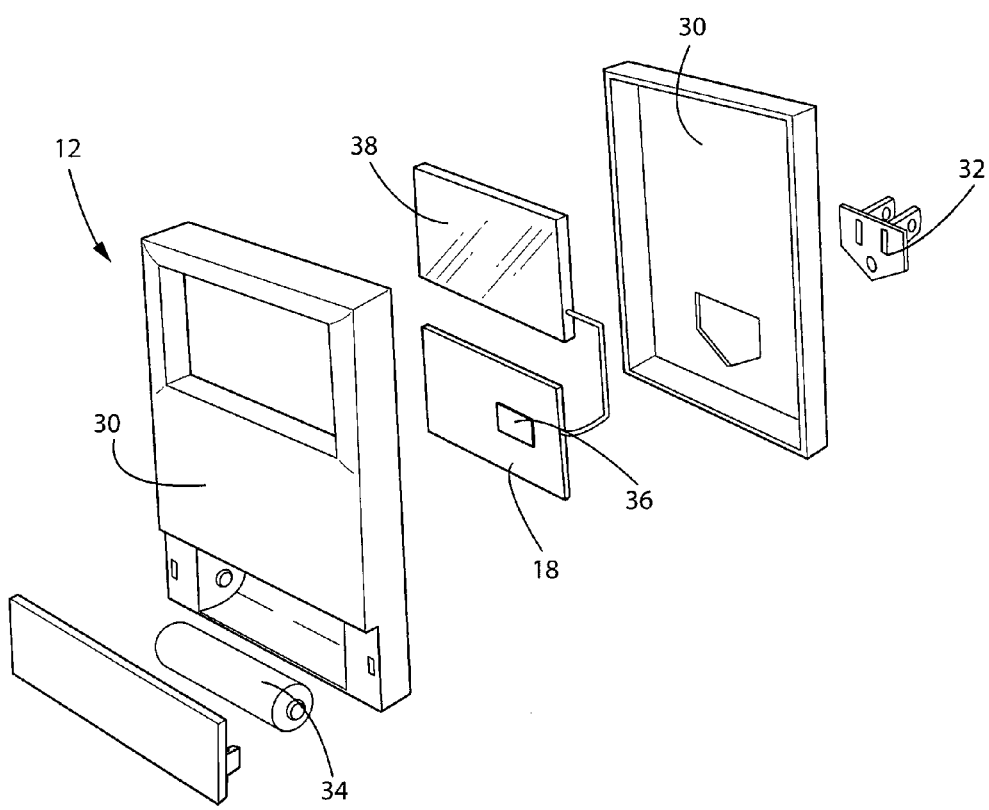
FIG. 3 is an exploded isometric view of the wall transmitter of FIG. 2.

Referring now to FIG. 3, the transmitter 12 may include a housing 30 for securely housing the transmitter circuitry and associated electronics. The housing 30 may include a number of electrical connectors 32 such as prongs or the like for interconnecting the transmitter 12 to a wall outlet, plug or socket for providing power to the transmitter.

The transmitter 12 may additionally include a transmitter backup power source 34 such as a battery or the like. The transmitter backup power source 34 may be a rechargeable battery such that when the transmitter 12 is coupled to the wall outlet, plug or socket, the transmitter backup power source 34 is charged so as to be operable in the instance of a power loss.

The transmitter 12 may further include a sensor 36 configured to detect a power loss condition. Once the sensor 36 detects a power loss condition, the sensor 36 relays a signal to the electronics arrangement 18, which then transmits the signal to the receiver 14. The sensor 36 may be configured in a number of different ways such that it only detects power loss conditions of a predetermined duration such that temporary losses in power do not result in the transmission of a signal from the transmitter 12. The sensor 36 may be configured so as to be able to distinguish between a power loss event where no power is available at the outlet or power source and a switch that may be operable via a wall switch or some other means whereby power is still available at the given outlet although not present. It is also contemplated that the sensor may detect other conditions besides power loss, such as carbon monoxide, smoke, heat, motion or sound. The transmitter may further include a transceiver for communicating with a wireless network, such as WiFi or ZigBee.

The transmitter 12 may also include a lighting feature 38, such as an LED panel or small output incandescent light bulb, which may serve as a nightlight or flashlight. The lighting feature 38 may be powered by the utility power or battery power of the transmitter 12, and may be configured to illuminate only during certain lighting conditions, such as during a black-out or low lighting conditions.

Figure 4A:
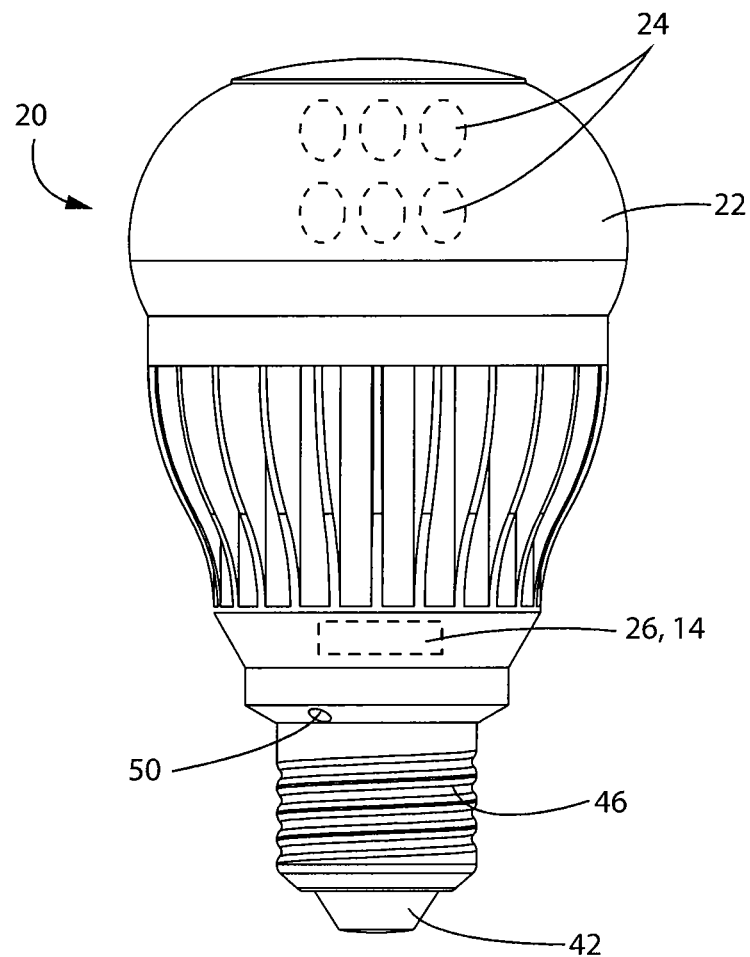
FIG. 4A is a side elevation view showing the LED lamp of FIG. 2.
Figure 4B:
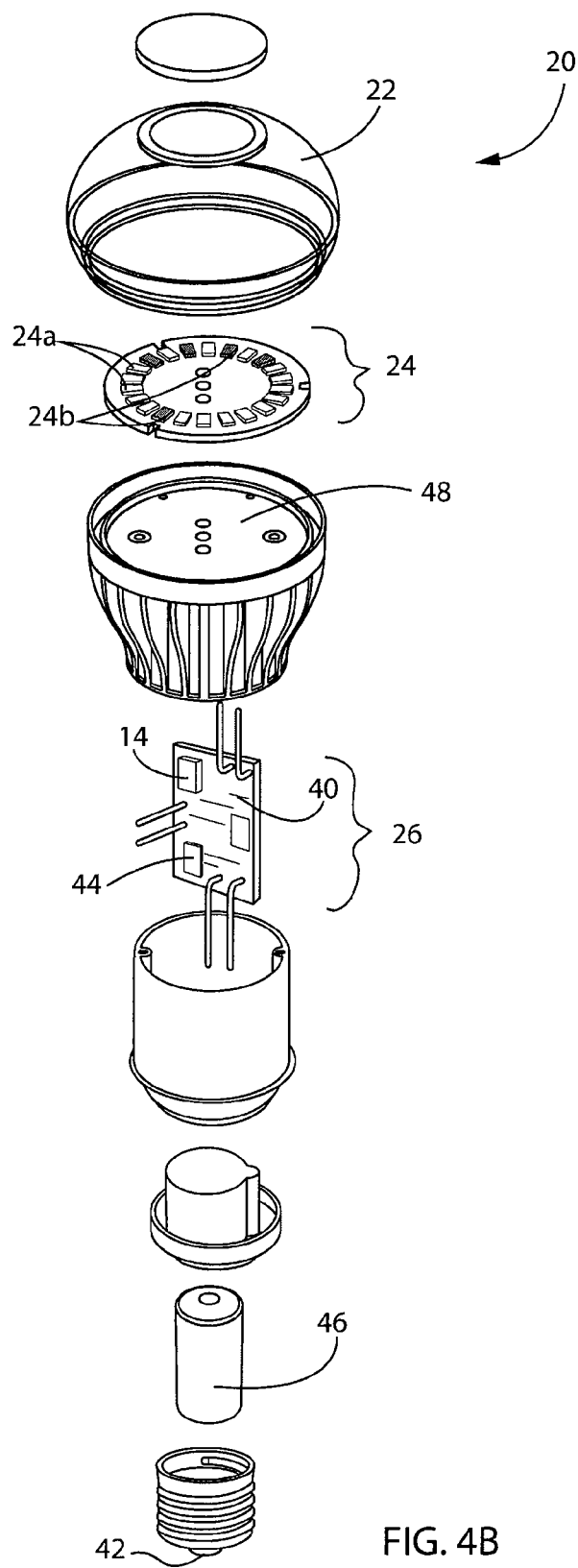
FIG. 4B is an exploded isometric view of the LED lamp of FIG. 4A.

Referring now to FIGS. 4A and 4B, one representative embodiment of the receiver is a lighting device 20, such as a LED bulb or LED lamp having a built-in electronics arrangement 26. The lighting device 20 is operably coupled to the printed circuit board or control board 40 to illuminate the light-emitting elements 24 of the LED lamp upon receipt of a signal from the transmitter 12 indicating that there has been a power outage. The electronics arrangement 26 of the lamp may include a sensor 44 for detecting a loss of power. The sensor 44 may be operably coupled with a control board 40 that is operable to receive an indication from the sensor 44 that power to the lighting device 20 has been lost. The control board 40 may then be configured to selectively operate the lighting device 20 on a backup power source such as a battery 46. The backup power source may be external to the lighting device 20 or built into the lighting device 20.

The lighting device 20 may include a power coupling element 42 such as, for example, an electrical contact, prongs or the like configured to be selectively coupled with an external power source such as a standard outlet or light fixture. In this manner, the lighting device 20, via the control board 40, may be configured to operate off an external power source when primary power is available and then switch to the backup power source 46 upon detection of a power loss by sensor 44. The backup power source 46 may be rechargeable such that when the lighting device 20 is operating on primary power, the backup power source 46 is recharged.

When power is present, the lighting device 20 may be configured to be powered from the primary power source via a traditional wall outlet, socket or fixture as previously discussed, or, in the alternative, as desired, the lighting device 20 may be disconnected from any permanent power source and configured to only illuminate upon occurrence of a power outage wherein the lighting device 20 is powered via the backup power source 46. During a power outage, the lighting device 20 is configured to operate off the backup power source 46.

As indicated previously, once the receiver 14 receives the signal from the transmitter 12 indicating a loss of power, the receiver 14 relays the signal to the control board 40, which then directs the electronics arrangement 26 to enter an emergency mode in which the light-emitting elements 24 are illuminated to provide illumination in and around the area of the lighting device 20. In one construction, the light device may have an antenna for receiving the signal from transmitter 12 from a farther distance.

In the representative embodiment, the lighting device 20 contains light emitting elements 24 in the form of an LED module having a plurality of LEDs 24a, 24b. The plurality of LEDs may be on an LED chip. The device also contains an electronics arrangement 26 and a heat sink 48. The heat sink 48 may be, e.g., an aluminum disk or other heat conducting material, which dissipates the heat from within the LEDs themselves. The LED module may include two types of LEDs to prevent the need for electronics, such as an AC/DC converter or driver, between the lighting device and the power supply. The lighting device may contain a plurality of AC-LEDs 24a which can operate directly off an AC power supply. Thus, the lighting device has the capability of being illuminated by AC utility power without converting the current. The lighting device may also contain a plurality of DC-LEDs 24b which can operate directly off a DC power supply. Thus, the lighting device has the capability of being illuminated by DC power without converting the current. It is contemplated that the number of DC-LEDs 24b is less than the number of the AC-LEDs 24a in order to conserve the energy delivered from the backup power supply, namely, the battery. However, any number or configuration of the two types of LEDs may be presented. By utilizing dual types of LEDs, power is transmitted more efficiently and power is delivered more effectively without the need for intervening electronics.

The lighting device 20 may be configured to illuminate all or a subset of the light-emitting elements 24 at full or partial power. In addition, the light-emitting elements 24 or a subset thereof, may be flickered, sequenced, repeatedly turned on and off, etc. In this manner, the lighting device 20 may be configured to provide illumination while still conserving power to prolong the battery life and extend the duration of operation. In at least one construction of the lighting device 20, the lighting device may be configured so that as the battery power is expended the number of operable light-emitting elements 24 and/or intensity of the light-emitting elements 24 is reduced. The lighting device 20 may include means, such as a mechanical switch, for setting the light-emitting elements 24 to operate in a predetermined mode such that a user of the lighting device 20 may select a predetermined manner of operation. For instance, the lighting device 20 may incorporate a button, toggle, chain, or the like for switching between the different illumination modes of the light-emitting elements 24. In at least one construction of the present invention, the lighting device 20 may be configured so that a signal may be sent from the transmitter 12 to the receiver 14 of the lighting device to indicate a given mode of operation.

In one construction of the lighting device of the present construction, the lighting device 20 may additionally include a photosensor element 50 configured to detect the presence of natural light. Moreover, the photosensor element 50 may be operably coupled with the control board 40 to prevent operation of the lighting device 20 during daytime hours to conserve on power consumption.

As previously discussed, the backup power source 46 may be one or more rechargeable batteries or may be a standard battery. In either case, the lighting device 20 may be configured to detect a low battery condition such that upon occurrence of a low battery level, the lighting device 20 may be configured to notify an operator that the battery needs to be recharged and/or replaced. The lighting device 20 may be configured to notify the operator via an audible or visual indication such as through the transmission of a sound or the illumination of an indicator light or in any other such manner known in the art.

It is contemplated that the lighting device 20 may be a wide variety of lighting types, fixtures, and arrangements. For example, the LED lamp may be constructed to fit into preexisting down lighting or linear lighting fixtures, such as standard fluorescent troffers and the like. The LED lamp may conform to the recognized lighting standards, such as UL and ANSI light standards, thus providing a wholly compatible light bulb or lamp for preexisting light fixtures.

As shown in FIG. 5, in another construction of the present invention, the lighting device 20 may include a secondary housing 52 for electrically coupling a standard lighting element 54, such as a standard incandescent, neon, LED or other such lighting element that may be configured to operate when primary power to the lighting device 20 is available. The lighting device 20 is configured to be coupled to a standard lighting fixture as previously discussed for supplying primary power to the lighting device 20. The lighting device 20 may be configured such that when the primary power is active, the light-emitting elements 24 are not illuminated such that only the standard lighting element 54 is illuminated.

Understandably, in the alternative, the lighting device 20 may be configured such that the standard lighting element 54 and the light-emitting elements 24 or a subset thereof are illuminated at the same time. When the transmitter 12 detects a power outage, the lighting device 54 may then be configured to switch to operate solely on light-emitting elements 24 as previously discussed. The electronics arrangement 26 and receiver 14 may be located within the secondary housing 52.

The secondary housing 52 may include one or more LEDs or other light-emitting elements disposed around a periphery of the secondary housing 52 and may be configured for providing additional illumination during a power outage. In such cases, the light-emitting elements may be replaced by a standard light source such as an incandescent or CFL bulb. Understandably, the standard lighting element 54 may still be provided as a number of LEDs housed within a lens as shown.

As previously discussed, the light emitting elements of the secondary housing 52 may be DC-LEDs which can operate directly from a DC power supply, such as a built-in or replaceable battery. In such a case, the standard lighting element 54 may include AC-LEDs, an incandescent or CFL bulb, and may operate directly from an AC power supply when primary power is provided.

Referring now to FIG. 6, another construction of the lighting device 20 according to the present invention is shown in which the receiver 14 is incorporated into a standard light fixture 60 of the kind known in the art. In this construction, the receiver 14 may be constructed in the manner previously described and include an electronics arrangement including means for operatively coupling the receiver 14 with the light fixture 60 for operation thereof.

The lighting device 20 may be configured as a self-contained unit that runs off the backup power source 46 and is only illuminated during a power outage. The lighting device 20 of the present construction may be configured for mounting in any location as it need not necessarily be powered off of a primary power source. In at least one construction of the present invention, the backup power source 46 is a long-life battery that is configured to consume very little power, e.g., a LiFePO4 battery. The lighting device 20 of the present construction may be configured to include a receiver 14 as in the prior embodiments but may be configured to only periodically monitor for signals from the transmitter 12 in order to save battery life.

In one construction of a lighting device 20 according to the present invention, the lighting device 20 may additionally include at least one solar panel (not shown) configured to charge the backup power source 46. In such a construction, the lighting device 20 may be configured to be situated near a natural light source such as, near a window, etc.

Figure 7A:
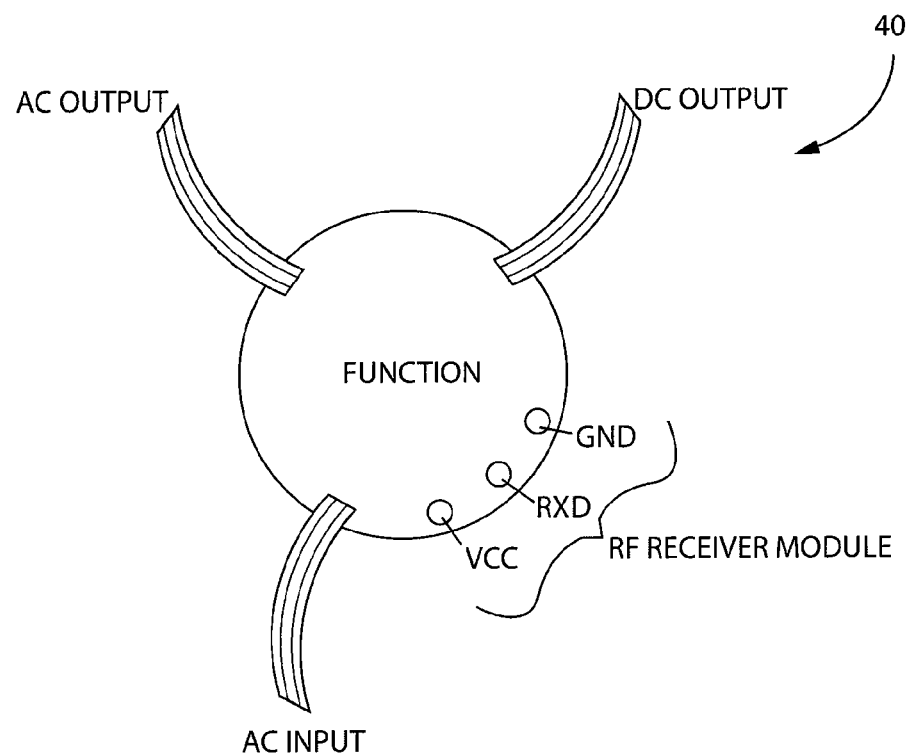
FIG. 7A is a schematic drawing of a circuit board coupled to a receiver, which is incorporated into the light assembly.
Figure 7B:
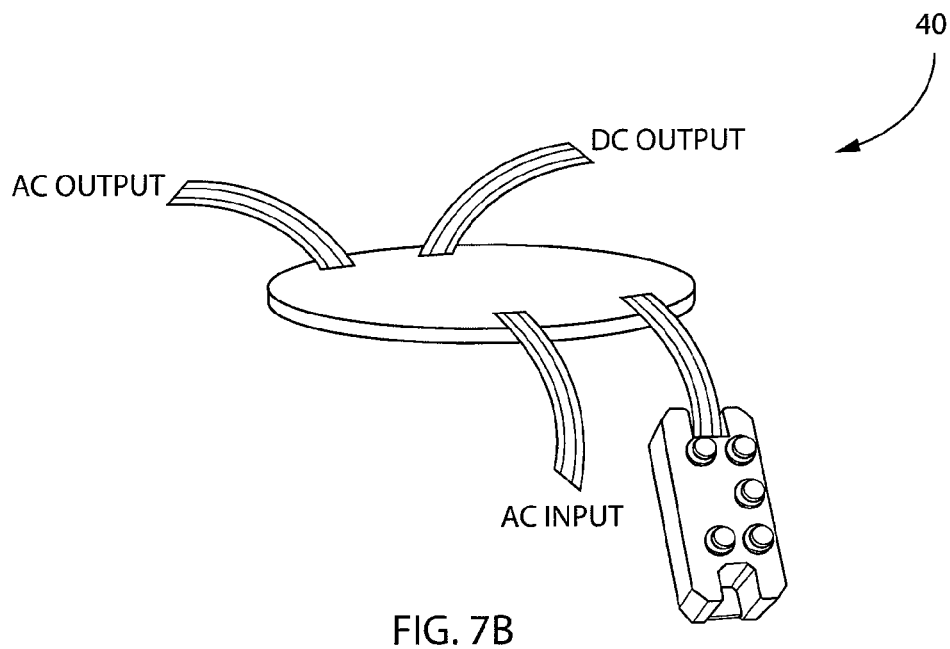
FIG. 7B is a side elevation view showing the circuit board of FIG. 7A.

Referring now to FIGS. 7A and 7B, a simplified schematic representation of the control board 40 of electronics arrangement 26 is shown. The schematic representation shows the function of the control board 40 when AC power is delivered to the lighting device. The input is direct AC input coming from, e.g., a standard power outlet (AC 120V 60 Hz or AC 220V 50 Hz) or hard-wiring. The AC input is divided into two outputs, namely, AC output (120V 60 Hz) and DC output (3V-5V). The AC output is delivered to the lighting device. The DC output charges a backup power source, such as a battery. The battery has a protective function with a standard charge and discharge setting to protect it from short circuit, overcharge, and over-discharge. There may also be a function to tell the consumer that the battery needs to be replaced, for example, an audible or visual warning, as noted above.

Connected to the control board 40 is a RF receiver module, as shown in FIG. 7B, for receiving signals or communication data. The RF receiver module has a VCC pin to provide power, a RXD pin to receive data, and a ground (GND) pin to complete the circuit and reduce electromagnetic interference. During normal operation when utility power is delivered, AC output is "on" to deliver AC power to the lighting device, and DC output is "on" to charge the battery. When the battery is fully charged, the protective feature will shut "off" DC output to the battery and keep AC output "on" to the lighting device. When the RF receiver module receives a signal that utility power has been interrupted, AC output is shut "off", and DC output is turned back "on" so that the battery is allowed to deliver DC power to the lighting device.

The size of the control board 40 is relatively small, e.g., maximum 35.95 mm diameter×24.9 mm, and may be 30 mm diameter×15.5 mm. It is contemplated that the control board 40 may also have a transceiver, such as a ZigBee chip, to receive data communication and switch from AC power operation mode to battery operation mode. The control board 40 may also include a photosensor to conserve battery during daylight hours. It is contemplated that the control board and associated electronics are sized to be built into the body of the lighting element.

Figure 7C:
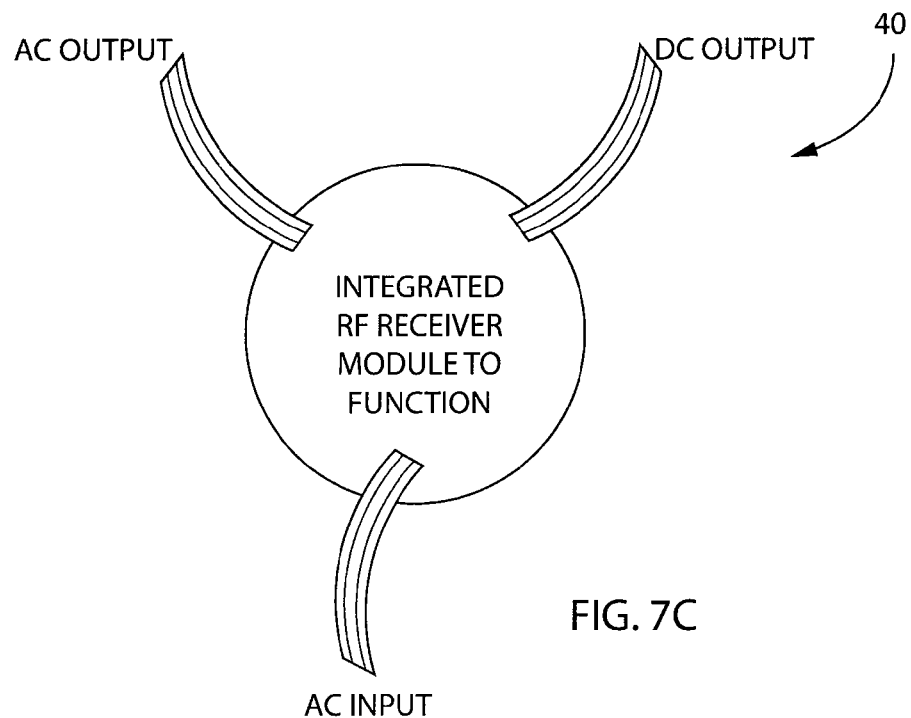
FIG. 7C is a schematic drawing of an alternative embodiment of a circuit board with an integrated receiver, which is incorporated into the light assembly.
Figure 7D:
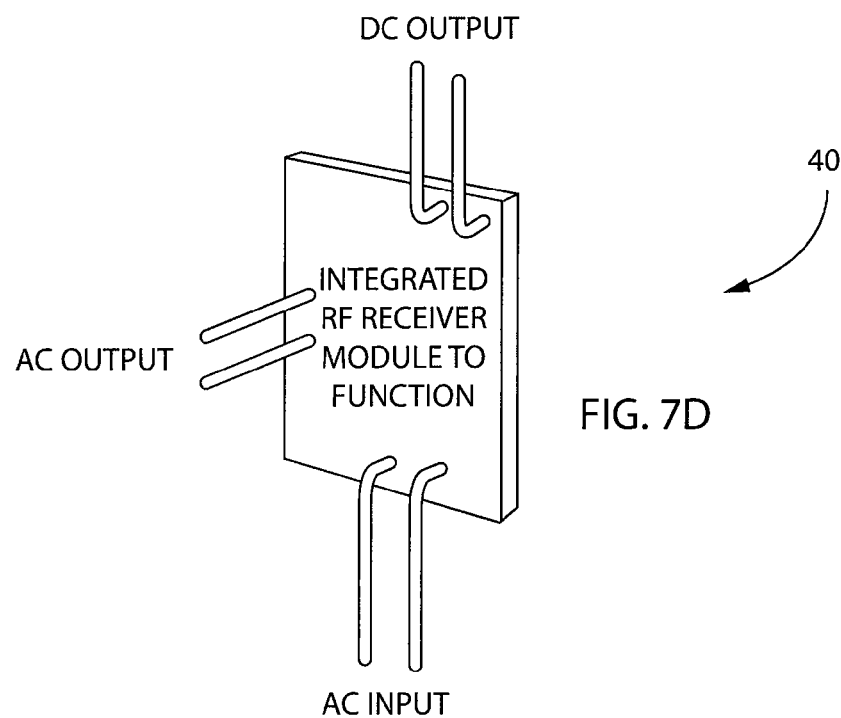
FIG. 7D is a schematic drawing of an alternative embodiment of the circuit board of FIG. 7C having an alternative configuration.

Referring now to FIGS. 7C and 7D, a simplified schematic representation of the control board 40 of electronics arrangement 26 is shown having an alternative configuration. The schematic representation shows the RF receiver module function integrated into the control board 40. As described previously, the AC input is divided into two outputs, namely, AC output (120V 60 Hz) and DC output (3V-5V). FIG. 7D shows an alternative configuration of FIG. 7C wherein the control board 40 and input/output connections may be constructed in various shapes and sizes, and disposed in various arrangements with respect to one another.

Figure 8:
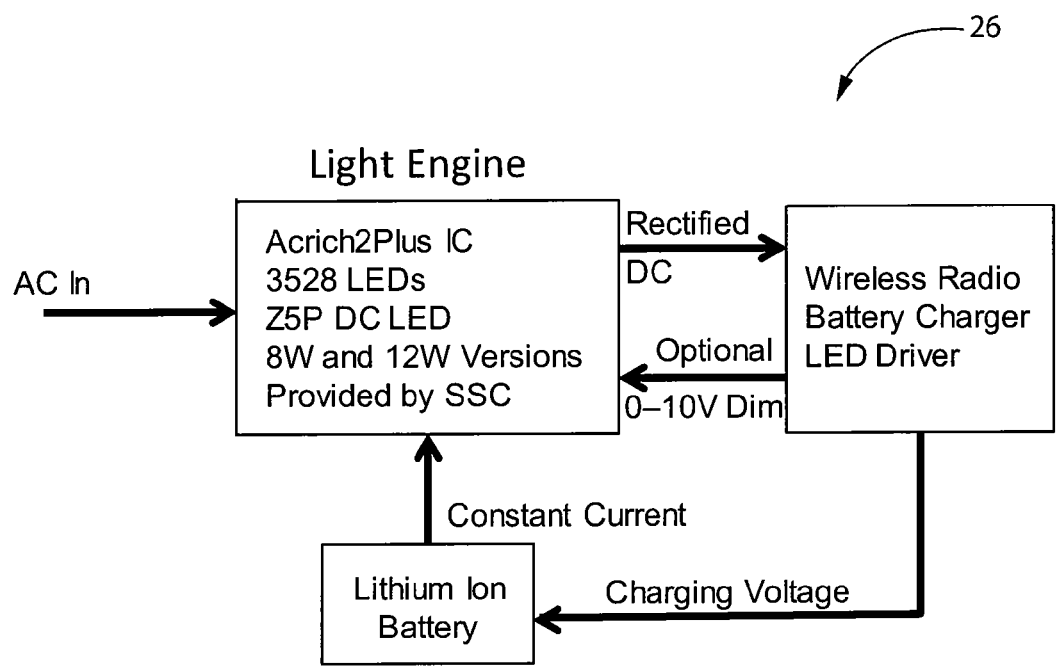
FIG. 8 is a schematic block representation of the electronic arrangement incorporated into the light assembly.

Referring now to FIG. 8, in one construction of the present invention the electronics arrangement 26 includes AC input providing power to the AC-LEDs and optionally charging the backup power supply battery. The schematic diagram of FIG. 8 shows AC input to the light engine. The light engine contains an integrated circuit, e.g., Acrich2Plus IC, and a plurality of AC-LEDs and DC-LEDs (8 W and 12 W versions of each). The AC input illuminates the AC-LEDs while rectified DC output is driven to the wireless radio, battery charger, and LED driver. Optionally, 1-10V DIM driver (allows a minimum dim level of 10%) is provided to the light engine. A charging voltage exits the battery charger/LED driver to charge the battery, e.g., Li ion battery. When AC input is not provided, constant DC is delivered from the battery to the light engine to provide power to the DC-LEDs.

Figure 9:
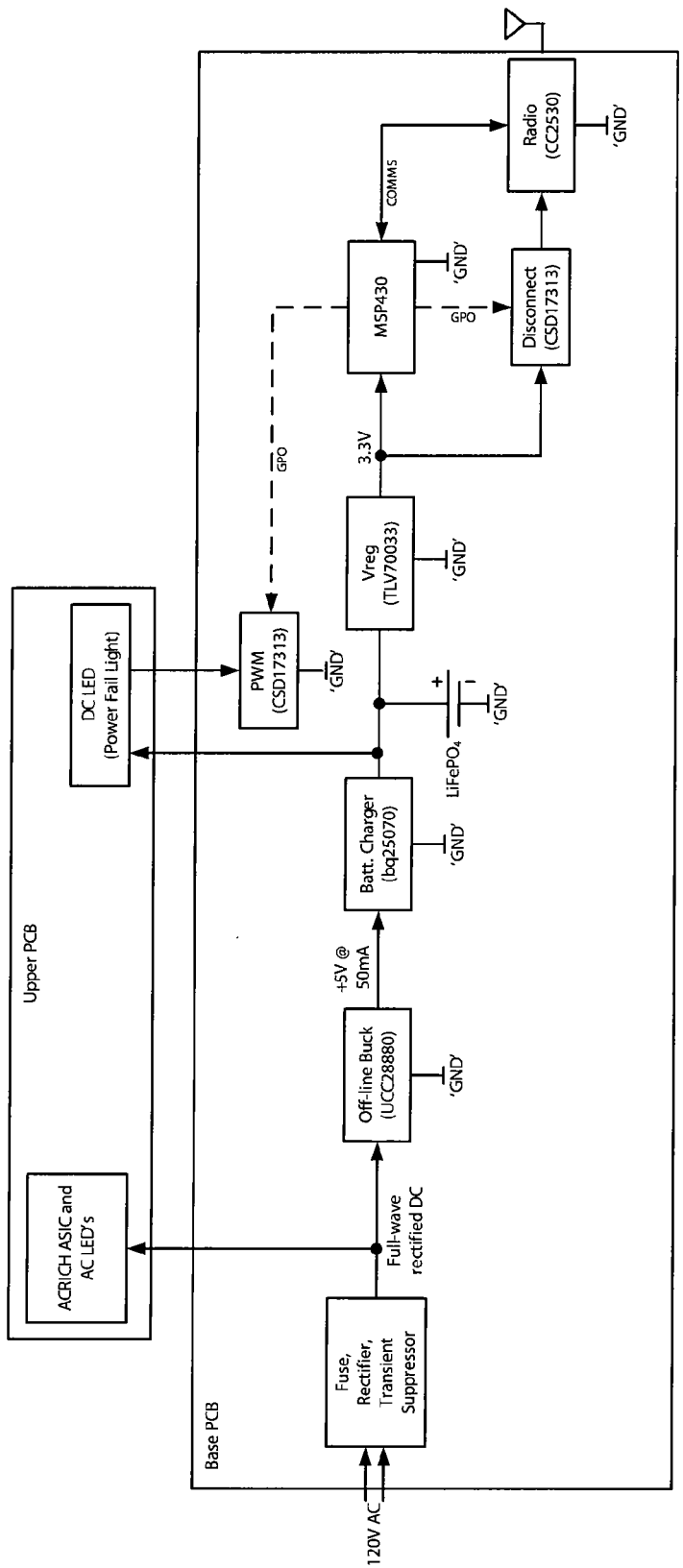
FIG. 9 is a schematic block representation of an alternative embodiment of the electronic arrangement incorporated into the light assembly.

Referring now to FIG. 9, in an alternative construction of the present invention, AC power is rectified to DC power according to an electronics arrangement 26 provided by, e.g., control board 40 as shown in FIGS. 7A and 7B. The schematic diagram of FIG. 9 shows AC power (120V AC) entering the fuse, rectifier, transient suppressor and exiting as full-wave rectified DC power. The rectified DC power is delivered to the integrated circuit, e.g., Acrich Application-Specific Integrated Circuit (ASIC), and AC-LEDs when AC power is provided, or alternatively, to the battery, e.g. LiFePO4 battery, and DC-LEDs in the event of a power failure.

Figure 10:
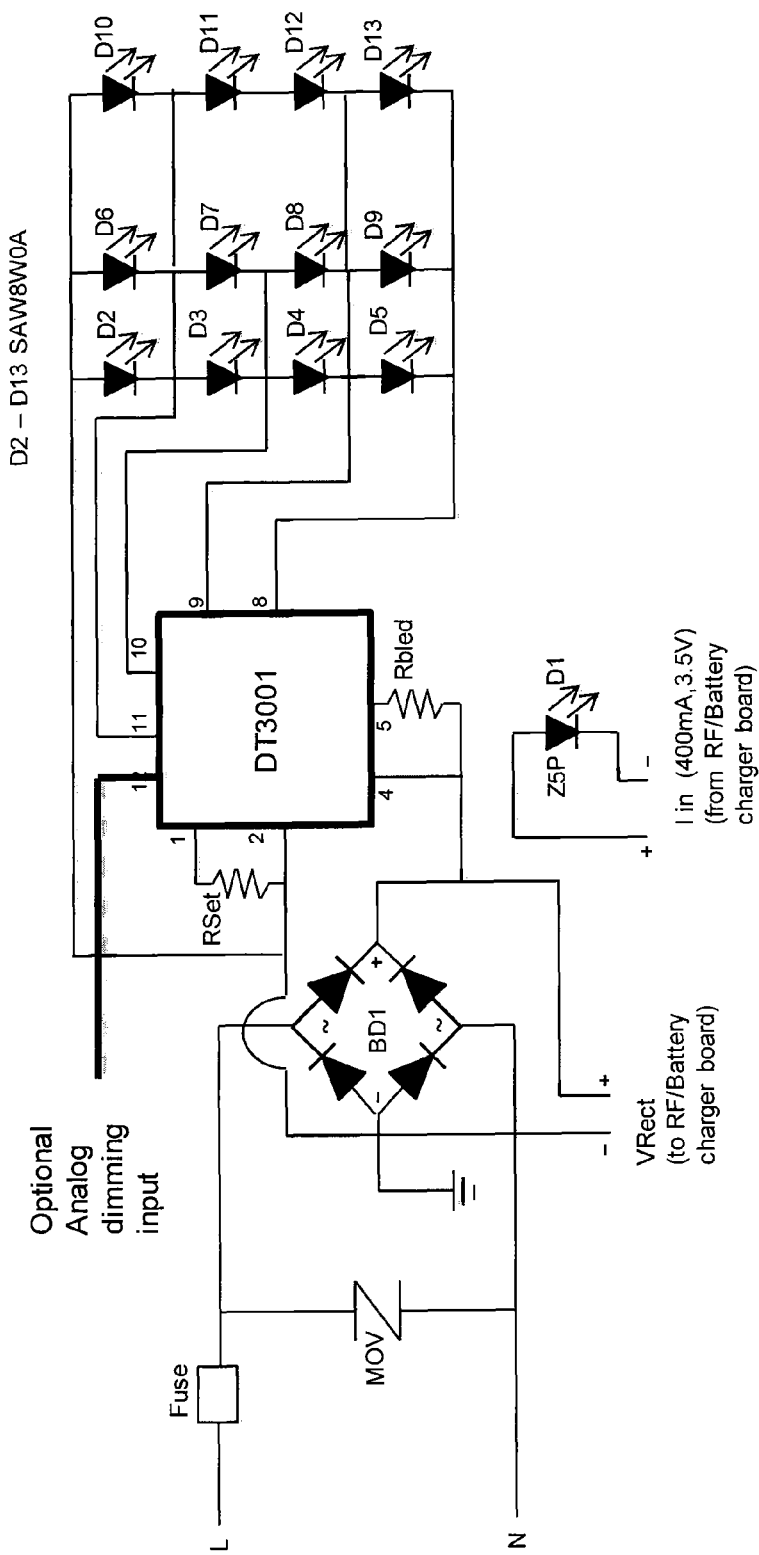
FIG. 10 is a circuit diagram showing the light engine of FIG. 8.
Figure 11:
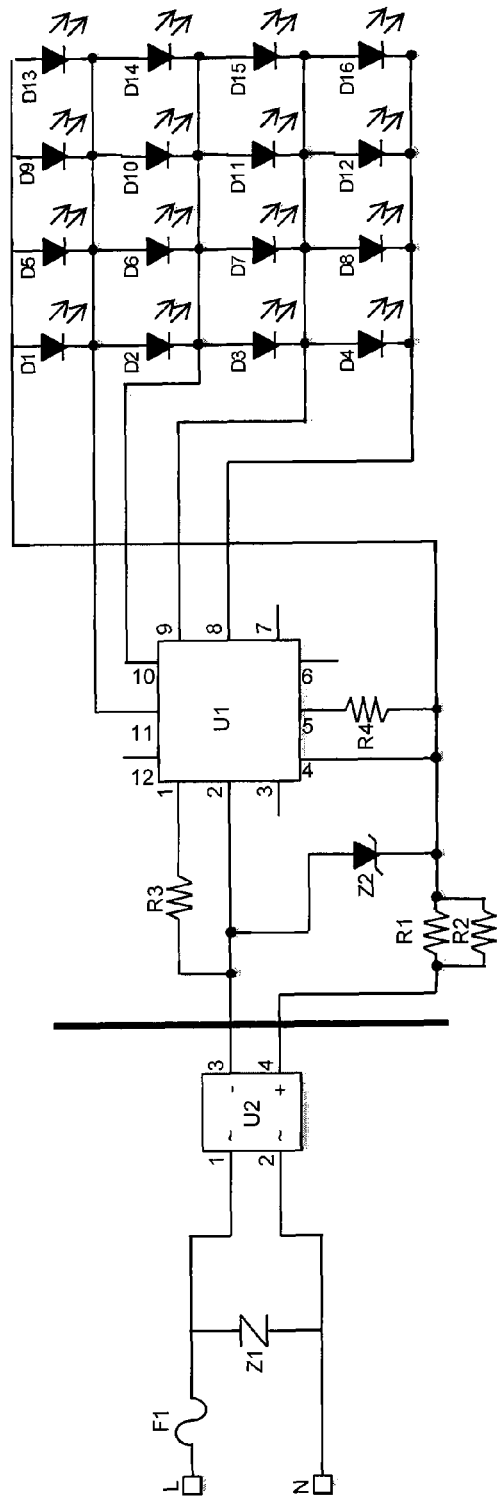
FIG. 11 is a circuit diagram showing the light engine of FIG. 9.

FIGS. 10-11 illustrate representative circuit diagrams showing alternative embodiments of the light engine of FIGS. 8 and 9. The light engine circuit arrangement of FIG. 10 may be used in accordance with the electronics construction of FIG. 8. The light engine circuit arrangement of FIG. 11 may be used in accordance with the electronics construction of FIG. 9.

Various alternatives and embodiments are contemplated as being within the scope of the following claims, which particularly point out and distinctly claim the subject matter regarded as the invention.

We claim:

1. An emergency lighting device comprising:
   a transmitter adapted for connection to a first AC power source;
   a receiver unit by which a signal is received from the transmitter in the event power from the first AC power source is interrupted;
   a lighting device coupled to the receiver, the lighting device comprising:
      an electronics arrangement comprising:
         a light engine comprising an integrated circuit, a plurality of AC-LEDs for receiving AC power from a second AC power source without power conversion, and
         a plurality of DC-LEDs;
         a battery for supplying DC battery power separate from the second AC power source to the plurality of DC-LEDs without power conversion when the AC power to the lighting device is interrupted, wherein the battery powers the plurality of DC-LEDs without powering the plurality of AC LEDs when the AC power to the lighting device is interrupted, and wherein the second AC power source powers the plurality of AC LEDs without powering the plurality of DC LEDs during normal supply of the AC power to the lighting device, wherein either the plurality of AC-LEDs or the plurality of DC-LEDs are capable of being illuminated at any one time:
         a battery charger for delivering a charging voltage to the battery when a rectified DC output is driven to the battery charger from the light engine; and
         a LED driver configured to optionally dim the illumination of the DC LEDs when the DC power is supplied to the DC LEDs.

2. The emergency lighting device of claim 1 further comprising:
   a sensor coupled to the transmitter for detecting a loss of power condition.

3. The emergency lighting device of claim 2 further comprising:
   a battery coupled to the transmitter.

4. The emergency lighting device of claim 1 wherein the receiver unit, the lighting device and the battery are contained within a lamp assembly that includes an engagement arrangement for selectively engaging the lamp assembly within a socket.

5. The emergency lighting device of claim 1 wherein the receiver unit and the battery are contained within a base that includes an engagement arrangement for selective engagement within a socket, wherein the plurality of DC-LEDs are carried by the base, and wherein the lighting device is separate from and engageable with the base, wherein the lighting device carries the plurality of AC-LEDs.

6. The emergency lighting device of claim 1 wherein the emergency lighting device is a downlight lamp.

7. The emergency lighting device of claim 1 wherein the emergency lighting device is a linear lamp.

8. The emergency lighting device of claim 1 wherein the battery is a LiFePO4 battery.

9. The emergency lighting device of claim 1 wherein the signal is received through a ZigBee network.

10. The emergency lighting device of claim 1 wherein the plurality of AC LEDs comprise a series of 8 W and 12 W AC LEDs.

11. The emergency lighting device of claim 1 wherein the plurality of DC LEDs comprise a series of 8 W and 12 W DC LEDs.

12. A lighting system comprising:
    a lamp housing;
    a light engine receiving AC power from an AC power source and comprising:
       an integrated circuit;
       at least one AC-LED interconnected with the lamp housing and configured to be selectively illuminated by the AC power source without power conversion; and
       at least one DC-LED interconnected with the lamp housing and configured to be selectively illuminated by a DC power source without power conversion and separate from the AC power source when the AC power source is interrupted and wherein the DC power source powers the at least one DC-LED without powering the at least one AC LED when AC power to the lighting device is interrupted, and wherein the AC power source powers the at least one AC LED without powering the at least one DC LED during normal supply of AC power to the lighting device, wherein either the at least one AC-LED or the at least one DC-LED is capable of being illuminated at any one time;
    a battery power source coupled to the lighting system and selectively providing DC power to the at least one DC-LED;
    a battery charger for delivering a charging voltage to the battery power source when a rectified DC output is driven to the battery charger from the light engine; and
    a LED driver configured to optionally dim the illumination of the DC LEDs when the DC power is supplied to the DC LEDs.

13. The lighting system of claim 12 further comprising:
    a transmitter for transmitting a power loss condition to the lighting system.

14. The lighting system of claim 12 wherein the AC power source is a utility power source.

15. The lighting system of claim 12 wherein the AC power is delivered to the at least one AC-LED and the DC battery power is delivered to the at least one DC-LED.

16. A lighting system comprising:
    a transmitter;
    a wireless receiver configured to receive data from the transmitter;
    a lighting device coupled to the wireless receiver comprising:
       an electronics arrangement comprising:
          a plurality of AC-light emitting diodes and a plurality of DC-light emitting diodes;
          a control board;
          a battery connected to the plurality of DC-light emitting diodes to provide DC power to the DC-light emitting diodes without power conversion, wherein the AC-light emitting diodes are not illuminated when DC power is provided to the DC-light emitting diodes and the DC-tight emitting diodes are not illuminated when AC power is provided to the plurality of AC-light emitting diodes, wherein either the plurality of AC-light emitting diodes or the plurality of DC-light emitting diodes are capable of being illuminated at any one time;

a battery charger for delivering a charging voltage to the battery when a rectified DC output is driven to the battery charger; and a LED driver configured to optionally dim the illumination of the DC LEDs when the DC power is supplied to the DC LEDs.

17. The lighting system of claim 16 further comprising:
an AC power source connected to the plurality of AC-light emitting diodes to selectively provide AC power to the plurality of AC-light emitting diodes without power conversion.

18. The lighting system of claim 16 wherein the transmitter is a handheld device.

19. The lighting system of claim 16 wherein the data is received over a ZigBee network.

* * * * *

UNITED STATES PATENT AND TRADEMARK OFFICE
CERTIFICATE OF CORRECTION

PATENT NO. : 9,107,269 B2  
APPLICATION NO. : 13/791256  
DATED : August 11, 2015  
INVENTOR(S) : John Douglas Martin et al.

Page 1 of 1

It is certified that error appears in the above-identified patent and that said Letters Patent is hereby corrected as shown below:

TITLE PAGE

(56) References Cited: Please add -- US Patent Publication 20120180935, 7/31/2013, Burdeen et al --.

IN THE CLAIMS

Claim 12, column 10, line 41, delete "con figured" and substitute therefor -- configured --.

Signed and Sealed this  
Twenty-second Day of December, 2015

Michelle K. Lee  
*Director of the United States Patent and Trademark Office*